US010558226B1

(12) United States Patent
Bigdeli

(10) Patent No.: US 10,558,226 B1
(45) Date of Patent: Feb. 11, 2020

(54) MICRO SELF-AWARE AUTONOMOUS AERIAL VEHICLE FOR HOME SAFETY AND SECURITY

(71) Applicant: Sepehre Bigdeli, Mission Viejo, CA (US)

(72) Inventor: Sepehre Bigdeli, Mission Viejo, CA (US)

( * ) Notice: Subject to any disclaimer, the term of this patent is extended or adjusted under 35 U.S.C. 154(b) by 0 days.

(21) Appl. No.: 15/242,628

(22) Filed: Aug. 22, 2016

(51) Int. Cl.
*G05D 1/10* (2006.01)
*G01C 21/20* (2006.01)
*B64C 39/02* (2006.01)
*G06K 9/00* (2006.01)
*H04N 13/204* (2018.01)

(52) U.S. Cl.
CPC ............ *G05D 1/101* (2013.01); *B64C 39/024* (2013.01); *G01C 21/206* (2013.01); *G06K 9/0063* (2013.01); *G06K 9/00771* (2013.01); *H04N 13/204* (2018.05); *B64C 2201/126* (2013.01)

(58) Field of Classification Search
CPC .................. G05D 1/101; G01C 21/206; B64C 2201/126; B64C 39/024; G06K 9/0063; G06K 9/00771
See application file for complete search history.

(56) References Cited

U.S. PATENT DOCUMENTS

2002/0072881 A1\* 6/2002 Saitta ........................ A62B 3/00
703/1
2016/0307366 A1\* 10/2016 Priest ...................... G06T 17/05

\* cited by examiner

*Primary Examiner* — Richard M Camby
(74) *Attorney, Agent, or Firm* — IP Law Leaders PLLC

(57) ABSTRACT

A system for use in monitoring a building. The system comprises a heavier-than-air programmable aircraft (aircraft) of dimensions suitable for use in the building and adapted to move within the building in the air, a position determining system adapted to determine a relative position of the aircraft within any room of the building and acquire additional spatial information of any room within the building so that the aircraft can travel within the building, and wherein the position determining system is further adapted to facilitate generation of a three-dimensional image representing an interior space of the building, one or more communications systems adapted to be carried by the aircraft, and a processor system adapted to receive data and commands through use of the one or more communications systems, and facilitate generation of the three dimensional image of the interior space of the building through use of the position determining system.

20 Claims, 6 Drawing Sheets

MICRO SELF-AWARE AUTONOMOUS AERIAL VEHICLE FOR HOME SAFETY AND SECURITY

TECHNICAL FIELD

The embodiments described herein relate generally to autonomously piloted aerial vehicles. or drones, and more specifically to systems, methods, and modes for a micro, autonomously-operated aerial vehicle/drone for use in home safety, and security using internal and external positioning methods and systems.

BACKGROUND

Sales and installation of home security systems continue to rise within the U.S. In addition, with the rise of home automation systems, these two systems are interconnected, if not wholly integrated, in many cases. Nonetheless, according to some sources, burglaries occur about every 15 seconds. About 60 percent of burglars use forcible entry to get inside a residence, and about 30 percent enter through unlock doors. The Bureau of Justice Statistics, Special Reports, states that a household member was home in approximately 28 percent of the burglaries (See, http://www.bjs.gov/content/pub/pdf/vdhb.pdf). In many cases, even though the house was "armed" with sophisticated alarm and home automation systems, the alarms were not turned on, activated, and/or monitored.

In addition to armed intruders, there are other sources of danger to those in the home or office environment. These can include things such as fire, carbon monoxide poisoning, radon, mold, and other airborne toxins. Things that might be innocuous or even useful in once instance (natural gas), can be fairly deadly in other cases. While there are some systems/devices (e.g., fire/smoke detectors) that can protect home inhabitants from one or more, or even several of these potential sources of "mayhem," none can offer an entire suite of integrated home protection. Further, even if one or more of the systems/devices described above were set-up correctly, enabled, and left on, many of these devices use batteries for primary and/or back-up/emergency power, and these batteries are often not replaced on a timely basis. Thus, there is the possibility of a home security system or suite of devices one or more parts of which can be completely useless, sometimes at the most critical of times.

As such, there are certain problems, with the conventional systems/solutions/devices described above. Accordingly, it would be desirable to provide methods, modes and systems for a micro, autonomously-operated aerial vehicle/drone for use in home safety, and security using internal and external positioning methods and systems.

SUMMARY

An object of the embodiments is to substantially solve at least the problems and/or disadvantages discussed above, and to provide at least one or more of the advantages described below.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

It is therefore a general aspect of the embodiments to provide a micro, autonomously-operated aerial vehicle for use in providing home safety and security that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a system for use in monitoring a building is provided, the system comprising: a heavier-than-air programmable aircraft (aircraft) of dimensions suitable for use in the building and adapted to move within the building in the air; a position determining system adapted to determine a relative position of the aircraft within any room of the building and acquire additional spatial information of any room within the building so that the aircraft can travel within the building, and wherein the position determining system is further adapted to facilitate generation of a three-dimensional image representing an interior space of the building; one or more communications systems adapted to be carried by the aircraft; and a processor system adapted to receive data and commands through use of the one or more communications systems, and facilitate generation of the three dimensional image of the interior space of the building through use of the position determining system.

According to the first aspect of the embodiments, the system further comprises one or more devices, a first subset of which are adapted to generate environmental and other types of data about the interior space of the building and exterior space around the building, and wherein a first portion of the first subset of the devices are adapted to be carried by the aircraft and to interface with the processor to communicate data generated by the one or more monitoring systems to a user.

According to the first aspect of the embodiments, the one or more devices comprises monitoring devices selected from the group consisting of a bio-detector/airborne pathogen detector, natural gas detector, carbon monoxide detector, and fire/smoke detector.

According to the first aspect of the embodiments, the system further comprises one or more devices, a first subset of which are adapted to generate environmental and other types of data about the interior space of the building and exterior space around the building, and wherein a first portion of the first subset of the devices are adapted to be located in the building, and adapted to communicate with the aircraft through the one or more communications systems carried by the aircraft. According to the first aspect of the embodiments, the one or more devices comprises monitoring devices selected from the group consisting of a bio-detector/airborne pathogen detector, natural gas detector, carbon monoxide detector, and fire/smoke detector.

According to the first aspect of the embodiments, the one or more communications systems comprises a communications system selected from the group consisting of a microphone, speaker, infra-red transceiver, optical reader/scanning surface, camera, display, video projector, and iris scanner.

According to the first aspect of the embodiments, the processor is further adapted to respond to program commands to monitor an environment of the building within which the aircraft operates, and the processor is further adapted to respond to program commands to perform security functions that include one or more of determining the number of and identity of one or more intruders in the building, the location of entry into the building, and the time of entry into building.

According to the first aspect of the embodiments, the processor is further adapted to capture an image of the intruder without direct commands to capture the image, and the processor is further adapted to verify if the image of the intruder matches an image of known occupants, friends, relatives of owners of the building.

According to the first aspect of the embodiments, the position determining system comprises: memory storage adapted to store at least one of a two-dimensional image file of the interior space of the building and a three-dimensional image file of the interior space of the building; and the processor, further adapted to determine an identity of a first room in the building by determining a relative position between a base station and the current location of the aircraft, determining the dimensions of the first room by determining the presence and relative distances between two or more infra-red reflectors in the first room and a current position of the aircraft, and using the determined relative position information and the determined relative distance information of the infra-red reflectors to match the same against the at least one of the two-dimensional image file and the three-dimensional image file representing the interior space of the building to generate a spatial three-dimensional model of the building.

According to the first aspect of the embodiments, the position determining system is further adapted to acquire the relative position and size of at least one or more of doors, windows, entrances, exits, and furniture within the first room.

According to the first aspect of the embodiments, the position determining system further comprises a distance measurement device adapted to measure relative distances in all three dimensions between the aircraft and substantially any object in the room, as well as the walls, ceiling, and floor of the room.

According to the first aspect of the embodiments, the distance measurement device can be at least one of a laser transceiver, an infra-red transceiver, and an acoustic transceiver.

According to the first aspect of the embodiments, the processor and position determining system are further adapted to move the aircraft through empty space of the building using the spatial three-dimensional model of the building, and wherein the processor is adapted to determine the relative position between the aircraft and the base through use of at least one of a laser gyroscope and micro electro-mechanical system device.

According to the first aspect of the embodiments, the system further comprises: a three-dimensional (3D) camera adapted to generate the three-dimensional (3D) image model of the interior space of the building for use by the aircraft.

According to the first aspect of the embodiments, the 3-D camera is adapted to be carried by the aircraft, and the aircraft is further adapted for self-controlled movement within the building.

According to the first aspect of the embodiments, the aircraft is further adapted to receive movement controls by one or more programs located on one or more of a computer, hand-held programmable device, smart-phone, and a remotely located computer through a server network.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified, and wherein.

DETAILED DESCRIPTION

Figure 1:
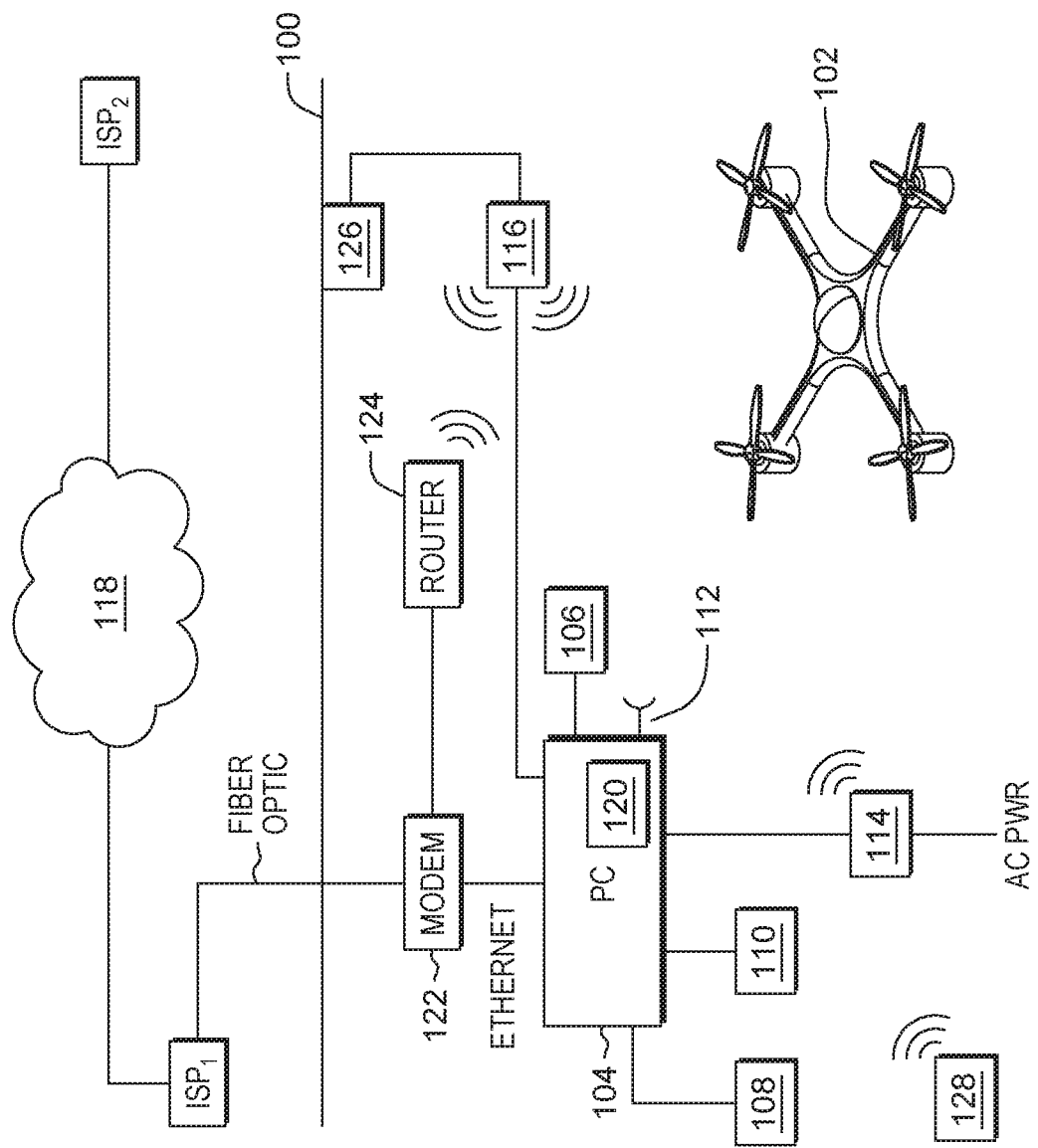
FIG. 1 illustrates a high level block diagram depicting a home environment in which a micro autonomous aerial vehicle can operate within according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of a micro, autonomously-operated aerial vehicle for use in home security. However, the embodiments to be discussed next are not limited to these systems but can be applied to other environments other than the home, and can be used for, by way of non-limiting examples, border patrol, corporate security, national security, and personal security (e.g., body guards), among other uses.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics can be combined in any suitable manner in one or more embodiments.

According to embodiments, the problems described above can be addressed by, for example, programming a home safety and security drone (HSSD) for use in a home or other similar environment, wherein the HSSD can perform a number of safety/security, entertainment, and communication functions. In addition, the MAAV, according to aspects of the embodiments, can determine a spatial three-dimensional (3D) model of the home or other environment within which it operates, through the use of minimal and inexpensive devices provided by the user/owner/operator.

List of Acronyms Used in the Specification in Alphabetical Order

Used throughout the specification are several acronyms, the meanings of which are provided as follows:

| | | |
|---|---|---|
| 2D | Two Dimensional | |
| 3D | Three Dimensional | |
| 3G | Third Generation | |
| 4G | Fourth Generation | |
| 5G | Fifth Generation | |
| App | Executable Software Programming Code/Application | |
| ASIC | Application Specific Integrated Circuit | |
| BIOS | Basic Input Output System | |
| BT | BlueTooth | |
| CD | Compact Disk | |
| CO | Carbon Monoxide | |
| CRT | Cathode Ray Tube | |
| DVD | Digital Video Disk | |
| EE | Electrical Erasable | |
| EEPROM | Electrical Erasable Programmable Read Only Memory | |
| FPGA | Field Programmable Gate Array | |
| GAN | Global Area Network | |
| GPS | Global Positioning System | |
| HDD | Hard Disk Drive | |
| HDMI | High Definition Multimedia Interface | |
| HSSD | Home Safety Security Drone | |
| IC | Integrated Circuit | |
| IPS/OA | Indoor Positioning System and Object Avoidance | |
| IR | Infra-Red | |
| IRR | Infra-Red Reflector | |
| ISP | Internet Service Provider | |
| LAN | Local Area Network | |
| LTE | Long Term Evolution | |
| Mic | Microphone | |
| Modem | Modulator Demodulator | |
| NFC | Near Field Communications | |
| NIR | Near Infra-Red | |
| PC | Personal Computer | |
| PDA | Personal Digital Assistant | |
| PED | Personal Electronic Device | |
| POTS | Plain Old Telephone Service | |
| RAM | Random Access Memory | |
| ROM | Read Only Memory | |
| RW | Read/Write | |
| SOC | System-on-(a)-Chip | |
| SSD | Solid State Drive | |
| TV | Television | |
| USB | Universal Serial Bus | |
| UVPROM | Ultra-Violet Erasable Programmable Read Only Memory | |
| VAC | Volts Alternating Current | |
| VGA | Video Graphics Array | |
| WAN | Wide Area Network | |

List of Reference Numbers for the Elements in the Drawings in Numerical Order

The following is a list of the elements of the Figures in numerical order:

| | |
|---|---|
| 100 | Home/Building |
| 102 | Home Safety Security Drone (HSSD) |
| 104 | Personal Computer (PC)/Server |
| 106 | Mouse |
| 108 | Keyboard |
| 110 | Monitor/Touch Screen Display |
| 112 | Antenna |
| 114 | Charging Station |
| 116 | Home Automation System |
| 118 | Internet |
| 120 | HSSD Interface Application (HSSD App) |
| 122 | Modulator/Demodulator (Modem) |
| 124 | Wireless (W/L) Router |
| 126 | Sensor(s)/Detector(s) |
| 202 | Airframe |
| 204 | Fan Blade and Housing Assembly |
| 206 | Motor |
| 208 | Battery |
| 210 | Recharging Controller Circuit |
| 212 | Recharging Port |
| 213 | Photovoltaic Cells |
| 214 | Processor |
| 216 | Memory |
| 217 | HSSD Operating Application |
| 218 | Data/Command Bus |
| 220 | Antenna |
| 224 | Transceiver |
| 226 | Bio-detector/Airborne Pathogen Detector |
| 228 | Natural Gas Detector |
| 230 | Carbon Monoxide (CO) Detector |
| 232 | Fire/Smoke Detector |
| 234 | Microphone (Mic) |
| 236 | Speaker |
| 238 | Infra-red (IR) Transceiver |
| 240 | Optical Reader/Scanning Surface |
| 242 | Camera |
| 244 | HSSD Display |
| 246 | Video Projector |
| 248 | Iris Scanner |
| 250 | Laser Transceiver |
| 300 | Method for Indoor Positioning, Object Avoidance and Operation of Home Safety and Security Drone |
| 302-318 | Steps of Method 300 |
| 402 | Infra-red Reflector (IRR) Tape |
| 404 | Room |
| 406 | Furniture |
| 408 | Window |
| 500 | Personal Computer/Laptop/Tablet/ Personal Electronic Device (PED)/Server (PC) |
| 501 | Shell/Box |
| 502 | Integrated Display/Touch-Screen (laptop/tablet etc.) |
| 504 | Internal Data/Command Bus (Bus) |
| 506 | Processor Internal Memory |
| 508 | Processor(s) |
| 510 | Universal Serial Bus (USB) Port |
| 511 | Ethernet Port |
| 512 | Compact Disk (CD)/Digital Video Disk (DVD) Read/Write (RW) (CD/DVD/RW) Drive |
| 514 | Floppy Diskette Drive |
| 516 | Hard Disk Drive (HDD) |
| 518 | Read-Only Memory (ROM) |
| 520 | Random Access Memory (RAM) |
| 522 | Video Graphics Array (VGA) Port or High Definition Multimedia Interface (HDMI) |
| 524 | External Memory Storage Device |
| 526 | External Display/Touch-Screen |
| 528 | Keyboard |
| 530 | Mouse |
| 532 | Processor Board/PC Internal Memory (Internal Memory) |
| 534 | Flash Drive Memory |
| 536 | CD/DVD Diskettes |
| 538 | Floppy Diskettes |
| 540 | Executable Software Programming Code/Application (Application, or "App") |
| 542 | Wi-Fi Transceiver |
| 544 | BlueTooth (BT) Transceiver |
| 546 | Near Field Communications (NFC) Transceiver |

| | -continued |
|---|---|
| 548 | Third Generation (3G), Fourth Generation (4G), Fifth Generating (5G) LTE (3G/4G/5G LTE) Transceiver |
| 550 | Communications Satellite/Global Positioning System (Satellite) Transceiver Device |
| 552 | Antenna |
| 554 | Internet |
| 556 | Universal Serial Bus (USB) Cable |
| 558 | Ethernet Cable (CAT5) |
| 560 | Scanner/Printer/Fax Machine |
| 600 | Network System |
| 602 | Mobile Device |
| 606 | Internet Service Provider (ISP) |
| 608 | Modulator/Demodulator (Modem) |
| 610 | Wireless Router |
| 612. | Plain Old Telephone Service (POTS) Provider |
| 614 | Cellular Service Provider |
| 618 | Communication Satellites |
| 620 | Cellular Telecommunications Service Tower (Cell Tower) |
| 622 | Internet |
| 624 | GPS Station |
| 626 | Satellite Communication Systems Control Station |
| 628 | Global Positioning System (GPS) Satellite |

FIG. 1 illustrates a high level block diagram depicting a home environment (home 100) in which HSSD 102 can operate within according to aspects of the embodiments. While the description made below is made in reference to home 100, those of skill in the art can appreciate through the discussions herein that the aspects of the embodiments are not limited thereto; that is, HSSD 102 can operate in substantially any indoor facility such as, but not limited to, private sector office buildings, government buildings, recreational facilities and arenas, shopping malls, and the like, and among many other different types of facilities. In addition, HSSD 102 can be used outdoors in both the area immediately surrounding the home or building/facilities described above, as well as very remote and rural areas, including those at sea. However, in fulfillment of the dual purposes of clarity and brevity, discussion shall only be made of HSSD 102 operating in a home environment such that as shown in FIG. 1, and which discussion shall now entail.

Home 100 can use one or more of HSSDs 102 to autonomously and remotely monitor a plurality of potential hazards, seen and unseen, heard and unheard, animate and in-animate, as well as to provide communications capabilities for entertainment purposes. In home 100 is personal computer (PC)/server 104, to which is attached monitor 110 (which can be a touch screen monitor, or plasma display panel, or cathode ray tube (CRT), among other display technologies), keyboard 108, mouse 106, and antenna 112 (which can be one or more of a near field communication (NFC) device antenna, 802.11xx WiFi antenna, BlueTooth (BT) antenna, among other types as well, such as proprietary communication systems); PC 104 and its ancillary devices are described in detail in regard to FIG. 5. PC 104 is further connected to internet 118 (either wired or wirelessly through a local modulator/demodulator (MODEM) 122, and wireless (W/L) router 124, and connection to an internet access provider, or via a wireless cellular interconnection (not shown)); internet 118 is part of a network, which is described in greater detail in regard to FIG. 6.

Also shown in FIG. 1, as part of home 100, is home automation system 116. Home automation system 116 can be in wired or wireless communication with PC 104, or mobile device 128. Mobile device 128 can include a program or application (App) that provides for control of home automation system 116, as well as HSSD 102 according to further aspects of the embodiments. Therefore, mobile device 128, home automation system 116, and PC 104 can include wireless communications systems such as WiFi, among others, the provides for communications between and among themselves and HSSD 102, which also can include such communications systems. Home automation system 116 can include, among other components, software or applications and devices that enable the homeowner to control interior and exterior lighting, shades, blinds, security systems (internal and external video/still cameras, door locks, among other devices), environmental controls (heating and cooling systems), audio/video distribution systems, fire, smoke, carbon monoxide, natural gas, and radon detection/monitoring, usage of electricity, water, and natural gas, lawn sprinkler systems, cooking devices, appliances (e.g., clothes washing machine, dishwasher, refrigerator, among other systems. As those of skill in the art can appreciate, currently available home automation systems 116 are or can be significantly complicated and complex systems that can cost thousands or even tens-of-thousands of dollars to specify, install, and program. A detailed discussion of home automation system 116 is not necessary to understand the aspects of the embodiments, and therefore, in fulfillment of the dual purposes of clarity and brevity, such discussion has been omitted from herein.

Still further in FIG. 1 is shown HSSD charger (charger) 114. Charger 114 can be a stand-along unit, i.e., having its own rechargeable battery that can be charged prior to being used to recharge HSSD 102, or it can be a more common type of charger that is simply plugged into wall/house 120 volts alternating current (VAC) power (or can even be a solar charger). Regardless of how charger 114 obtains its energy to recharge, when HSSD 102 returns or is placed in charger 114, the rechargeable battery onboard HSSD 102 will substantially immediately begin recharging, in a manner known to those of skill in the art. Also shown in FIG. 1 is sensor/detector 126; sensor/detector 126, of which there can be many such devices, is described in greater below in regard to FIG. 2.

Figure 2:
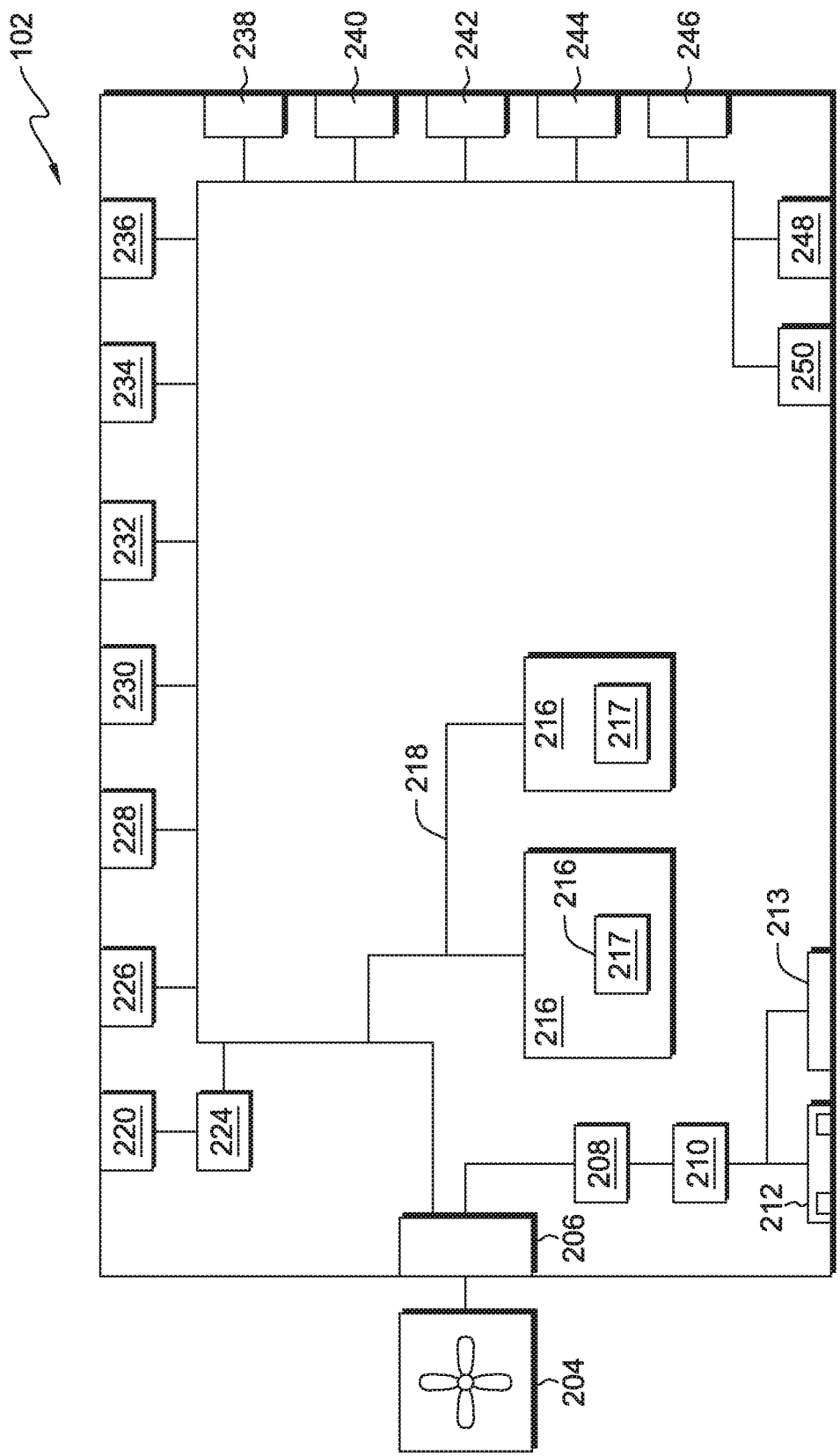
FIG. 2 illustrates a block diagram of the micro autonomous aerial vehicle as shown in FIG. 1 according to aspects of the embodiments.

FIG. 2 illustrates a block diagram of HSSD 102 as shown in FIG. 1 according to aspects of the embodiments. HSSD 102 comprises a plurality of devices that can be used to protect, entertain, monitor, warn, communicate with, and perform other functions, the occupants of home 100 according to aspects of the embodiments. HSSD 102 comprises airframe 202, fan blade and housing assembly 204, motor 206, battery 208, recharging controller circuit 210, recharging port 212, photovoltaic cells 213, processor 214, memory 216, data/command bus 218, antenna 220, transceiver 224, bio-detector/airborne pathogen detector 226, natural gas detector 228, carbon monoxide detector 230, fire/smoke detector 232, microphone (mic) 234, speaker(s) 236, infrared (IR) transceiver 238, optical reader/scanning surface 240, camera 242, display 244, video projector 246, iris scanner 248, laser transceiver 250, among other devices that can be added, from time to time.

Airframe 202 is designed to be aesthetically pleasing, and also designed to perform the function of a remotely or autonomously piloted airframe that can carry the devices described above, and fly inside or immediately outside a home, building, or some other structure. Airframe 202 can be made of molded plastic, or carbon resin material, among others, of suitable strength and lightness. One or more fan blade housing assemblies 204, of which there typically are four, but which can include fewer or more such assemblies, provides the lift and directional steering capabilities that are known to those of skill in the art. As such, in fulfillment of the dual purposes of clarity and brevity, a detailed description thereof shall not be repeated herein. Motor 206, which is typically an electric motor, though that need not necessarily be the case, provides the power to turn the blades on fan blade housing assembly 204, and which is in turn connected to battery 208, to which is connected recharging controller circuit 210. Recharging port 212, which interfaces with recharger 114, and/or photovoltaic cells 213, provides the electric power to recharge battery 208, in a manner known to those of skill in the art. In fulfillment of the dual purposes of clarity and brevity, a detailed description of the operation of, and interaction between of motor 206, fan blade housing assembly 204, battery 208, recharging controller circuit 210, recharging port 21 and photovoltaic cells, which is known to those of skill in the art, has been omitted from herein.

As described above, a plurality of devices provides for the functions of monitoring, protecting, entertaining, warning, and communicating with the occupants of home 100, or whichever building HSSD 102 is operating within or about. A brief discussion of the operation and/or use of such devices will be provided below, but in accordance with the dual purposes of clarity and brevity, since such devices are known to those of skill in the art, a detailed discussion of the devices need not be provided herein.

Bio/airborne pathogen detector 226 can detect the presence of contaminates such as radon, mold, asbestos and other toxins. While some or all of these contaminates can have natural or acceptable levels within the home or in the atmosphere outside the home, the levels can be adjusted by reference to authorities and/or other known experts. Thus, if the acceptable concentration levels change over time, HSSD 102 can receive notification and the alarm or reporting levels can be adjusted from time-to-time. Natural gas detector 228 detects the levels of natural gas in home 100, or in the vicinity thereby, and can issue reports/warnings depending on the levels of natural gas detected.

Fire/smoke detector 234 works in a substantially similar manner as conventional, wall or ceiling mounted fire/smoke detectors work. That is, fire/smoke detector 234 can be either the ionization type, photodetector type, or both, of conventionally available fire/smoke detectors. When a certain level of particles is encountered, an alarm can be generated, sprinkler systems can be engaged either automatically, or can seek confirmation from a pre-approved user (or from anyone), and reports/warnings generated, in a manner to be described below.

HSSD 102 can also operate as a motion detector, or, as described below, it can also wirelessly communicate with one or many stationed motion detectors (embodied as sensor/detector 126 in FIG. 1) that can be installed in different rooms, and can fly to that room as they report an event, through use of IR transceiver 238. IR transceiver 238 can detect the presence of living beings, with a settable sensitivity level so as to reduce/minimize false alarms. In addition, through use of one or more of mic's 234, intrusions or intruders can be detected depending on ambient noise level (which HSSD 102 can learn) and time of day/night, and unusual sound activities. If an unusual sound is detected, regardless of the time of day/night, HSSD 102 can further investigate and use camera 242 to report (and record) the source of the unusual noise/sound. An alarm and/or warnings/reports can be generated, in a manner to be described below. Mic 234 can also be used to interrogate people as they approach the front door or gate, prior to entry to home 102 according to aspects of the embodiments, or to converse with one or members or occupants of home via a voice-over-internet phone (VOIP) call using speaker 236, as described below.

HSSD 102 further includes one or more speakers 236 that can be used in a variety of different manners. By way of non-limiting example only, speaker(s) 236 can be used to conduct a phone call as described below, or in an intercom manner. Speakers 236 can also replicate the sounds of barking dogs, or can work with home automation system 116 to distribute music in places where conventionally mounted speakers have not been located. By way of a further non-limiting example HSSD 102 can use speaker 236 to send a message to a person on home 102 who might be, for example, working in the garden (e.g., instead of telling the child to "get your mom," the dad can send HSSD 102 with the message "hey honey, I need help with the bills," or "where do you want to go to dinner this evening?"), among other places and activities.

IR transceiver 238 can transmit, in response to one or more commands received, or in an autonomous manner, an IR signal or beam. If a signal is being transmitted, it can be in order to operate one or more different devices when operating in combination with home automation system 116, or autonomously, e.g., in place of a remote control. In addition, HSSD 102 can further include optical reader/scanner 240, which can read fingerprints, or which can scan photos or documents, and the like. Camera 242 can be further incorporated within HSSD 102 to take digital photographs or digital video of items or areas of interest. Camera 242 can be used with IR transceiver 238 to operate as an extremely sophisticated motion detection/identification system, e.g., virtually as a perpetual, non-tiring, completely and 100 percent of the time effective watch person.

Further shown in FIG. 2 is display 244 as part of HSSD 102. Display 244 can convey text or email messages to one or more persons of home 102, upon voice recognition as a means of security to receive the text/email message (other forms of currently available digital communications can be used as well, e.g., twitter and the like) according to aspects of the embodiments. In addition, display 244 can display printed documents, video, or still images according to further aspects of the embodiments. One or more of speakers 236 can also output an audio signal that is a conversion of text to speech; this type of function can be used to listen to texts, emails, and the like, through the use of another application/program (App), or one that is integrated with App 217 according to aspects of the embodiments. Display 244 can display warnings, logs of events, reports of the one or more sensors described herein, and virtually any other type of textually or graphically displayable information, or substantially any type of image, according to aspects of the embodiments.

Video projector 246 can be further included in HSSD 102 according to aspects of the embodiments. Video projector 246 can project videos onto a wall or screen within home 100 according to aspects of the embodiments. In addition, if there are two or more MAAVs 102, a first HSSD 102a can be recording video or still images, and using the communications equipment that can be installed on HSSD 102, it can transmit that video or still images to a second HSSD 102b (or PC 104 and display 110 or to home automation system 116 and TVs located throughout the home or building) such that an occupant can get a clear view of something that is occurring outside, or a person that has approached the front door or gate, according to aspects of the embodiments. Because of the highly maneuverable nature of HSSD 102, a user can send first HSSD 102a to any location within an operating zone (e.g., if a fire alarm has been indicated in the basement) and get an image of what is occurring at that location. Or, in a less somber example, a new mom or dad can use a first HSSD 102a as a (sophisticated) baby monitor, and let it hover there for extended periods of time, monitoring a sleeping infant (or not sleeping infant, as the case may be), and which can sense/monitor breathing rates, sleeping position, body temperature, among other body functions, and interface with medical diagnostic equipment, according to further aspects of the embodiments. In that case, the caregiver is not tied to a location of the baby monitor receiver, and can request the second HSSD 102b to follow the caregiver as they do their household chores from room to room, or work at their desk. Second HSSD 102b can then project the image of the (hopefully) sleeping infant so that the caregiver or parent can get their chores or work done. HSSD 102 can also upload/transmit such images via a video communication service, such as Skype®, among others.

HSSD 102 can further comprise iris scanner 248. As those of skill in the art can appreciate, there are two main types of iris scanners currently available in the market: the first is a near infra-red type (NIR) iris scanner, and the second is the visible wavelength type scanner. The former is the most predominant type, while the latter has only recently been studied and discussed in scientific journals. A detailed discussion of either of these types of scanners is not needed to appreciate the aspects of the embodiments, other than that either can be included in HSSD 102.

HSSD 102 can further comprise laser transceiver 250. Laser transceiver 250 can be used for determining, to a very high degree of accuracy, distances, the shapes of objects, temperatures, and other uses for which lasers can be used. For example, laser transceiver 250 can be used to determine/monitor the height of HSSD 102 (this can be performed periodically, or at pre-set times or intervals). Laser transceiver can also be of the type, and positioned on HSSD 102, such that it can make a 360° view of any room or location it finds itself in, and can use that information to make room measurements. In addition, laser transceiver can be installed in a downward looking direction (those of skill in the art can appreciate that the relative terms "front," "back," "left," "right," and so on, are not mutually exclusive in that as HSSD 102 can be operated such that it flies upside down periodically, or perpetually, or from time to time, so that duplicate sensors are not needed. Larger HSSDs 102 with more powerful engines can be flown on their sides to use certain devices in different manners.

In addition to height measurement, according to further aspects of the embodiments, laser transceiver 250 can also be used to accurately map objects on the floor so as to add information to a 3D map of the room/home 100/business environment (e.g., perform object recognition or object dimension determination). That is, HSSD 102 can use laser transceiver 250 accurately determine the dimensions of objects as it flies over them, and note their relative location, in a manner to be described below. In this manner, laser transceiver 250, among other devices, performs the function of a side-scanning sonar system that is used by submersibles to map the floors of the ocean to find shipwrecks, debris fields, and for other uses.

As discussed above, HSSD 102 includes the capability of generating and issuing reports or alarms. According to aspect of the embodiments, HSSD 102 can communicate to a base station, or PC 104, through use of antenna 220 and transceiver 224. Transceiver 224 and antenna 220, of which there can be more than one of each, can operate using near field communications technology, 802.11xx Wi-Fi, BT (any of the different varieties), or third generation/fourth generation/fifth generation (3G/4G/5G) LTE type of cellular communications technology (with 5G expected to be deployed about 2020), among others. Regardless of the one or more communications technology employed, PC 104 employs at least one matching communications technology to establish communications between PC 104 and HSSD 102 according to aspects of the embodiments. Communications between HSSD 102 and PC 104 enable a user to remotely pilot or control HSSD 102, exchange digital video or digital still images with HSSD 102, report and log readings of sensors, send and receive texts, emails, video and audio-alone phone calls, among many other types of communications.

As further described above, HSSD 102 can report problems or issue alerts depending on the output of sensor readings. According to aspects of the embodiments, there are at least three different scenarios that will drive a certain type of response or communication to the user PC 104. A type I scenario is one in which there is a clear and present danger: such types of events can include smoke, fire, excessive amounts of natural gas or carbon monoxide, dangerous or unsafe levels of radon, the detection of and excessive amounts of mold, or other airborne pathogens, the detection of intruders (hearing glass breaking at 2:30 in the morning), among other scenarios. A type I event can cause HSSD 102 to issue one or more texts, emails, and/or place phone calls (and any combination thereof) to the homeowner(s), security companies and/or local authorities (police, fire, emergency medical services, 911, among others). If video, audio, or still images, or any combination of the three of the event are available, then that can be sent as well via text/email. Face (and shape) recognition algorithms can be implemented as well: that is, the teenage offspring of the home owner(s) should not cause a type I alert, but in the case of an unidentifiable person, then such communication might well be prudent. Images of the children (and others that can be considered to be "non-intruders") can be stored in HSSD 102 to enable the use of such face recognition techniques, or the image processing can occur at PC 104, or it can occur in both places. In addition, when used by governmental agencies, the face recognition algorithms can access databases of internationally known or wanted "persons of interest" such as those for which warrants have been issued, or for people that have been placed on terrorist watch lists. According to further aspects of the embodiments, any and all of the data stored in HSSD 102, whether sent to it by communications through PC 104, or whether acquired through use of one or more of its sensors can be encrypted for substantially safe storage. Such encryption techniques are known to those of skill in the art, and thus, in fulfillment of the dual purposes of clarity and brevity, a detailed discussion thereof need not be included herein.

A type II scenario will include those types of situations in which notification to the homeowner can or should be made on some periodic basis, but not necessarily immediately, and also noted in a log for later retrieval and report generation purposes. Such situations can include status of batteries, energy and water usage, information pertaining to environmental conditions (temperature through the day, status of doors and windows, and the like). Other events and conditions can be classified as type III scenarios. A type III scenario are those that are merely data accumulation, with no need for even periodic reporting; these scenarios are generally data gathering exercises, and may only report to the home owner, or building manager on some long term periodic basis, such as once a week, or monthly. A type III scenario can be energy and water usage, or even the amount of times mail is delivered and at what times (in which a pressure sensor can be installed in the mailbox that records the total weight and time of mail delivery), among other similar such events the establishment of such scenarios (i.e., which events are to be categorized in each scenario, and what the parameters are to be for a report to be generated) can be predefined and programmed by the home owner or building manager on an App or program that is stored and used on PC 104 (such as MAAV interface App (MAAV App) 120); further as those of skill in the art can appreciate, such App can also be used on substantially any "smart" phone (a 3G/4G/5G LTE device), personal digital assistant (PDA), tablet, laptop, and the like.

As described above, HSSD 102 further comprises processor 214. Processor 214 is adapted to interface with all of the sensors and detectors on HSSD 102 via data/command bus (bus) 218 in a manner known to those of skill in the art. In addition, processor 214, which can be substantially any standardly available microprocessor, field programmable gate array (FPGA), application specific integrated circuit (ASIC), or combination of discrete IC components, also interfaces with motor 206, and recharging controller circuit 210 to control the flight of HSSD 102 according to aspects of the embodiments, as described in greater detail below. Motor 206 itself can include sensors to indicate its state of operation. Processor 216 is further adapted to interface with memory 216, in a manner known to those of skill in the art. Memory 216 can further be integrated within or part of processor 214, and can comprise many different types of memory, as further described below. Memory 216, regardless of whether it is a stand-alone type circuit, or integrated within processor 214, or some combination thereof, comprises one or more applications or programs (HSSD operating application; App) 217 adapted to operate HSSD 102 in the manner as described herein, including, but not limited to controlling the flight controls, battery recharging, communications with all of the sensors and detectors and other integrated devices contained within HSSD 102, and communications with PC 104, and HSSD App 120, according to aspects of the embodiments.

As mentioned above, home 100 further includes sensors/detectors 126; sensors/detectors 126 can include one or more, or all of the following: bio-detector/airborne pathogen detector 226, natural gas detector 228, carbon monoxide detector 230, fire/smoke detector 232, microphone (mic) 234, speaker(s) 236, infra-red (IR) transceiver 238, optical reader/scanning surface 240, camera 242, display 244, video projector 246, iris scanner 248, laser transceiver 250, among other devices that can be added, from time to time. Sensors/detectors 126 can be in wired or wireless communication with home automation system 116 according to aspects of the embodiments, and either or both of all of some of sensors/detectors 126 and home automation system 116 can communicate directly to HSSD 102 according to further aspects of the embodiments.

While the one or more HSSDs 102 that can be used in larger homes, business enterprise locations, of for border patrol, and the like, can includes the above described plurality of sensors/detectors, according to further aspects of the embodiments, one or more HSSDs 102 can instead communicate with sensors/detectors 126 that can be installed in home 100 or business environment (or sensors/detectors located outdoors). That is, HSSD 102 can be conduit of information that has been sensed/detected by other devices, and then can process and/or use this information to determine actions in accordance with the scenario situations described above. For example, HSSD 102 can receive an intruder alert at 0300 in the morning, and as this is a Type I scenario, HSSD 102 will generate a distress call (911, call the owner of home 100), turn on a siren and/or lights, go to the location and take video/still image photos, among other pre-programmable actions.

Figure 3:
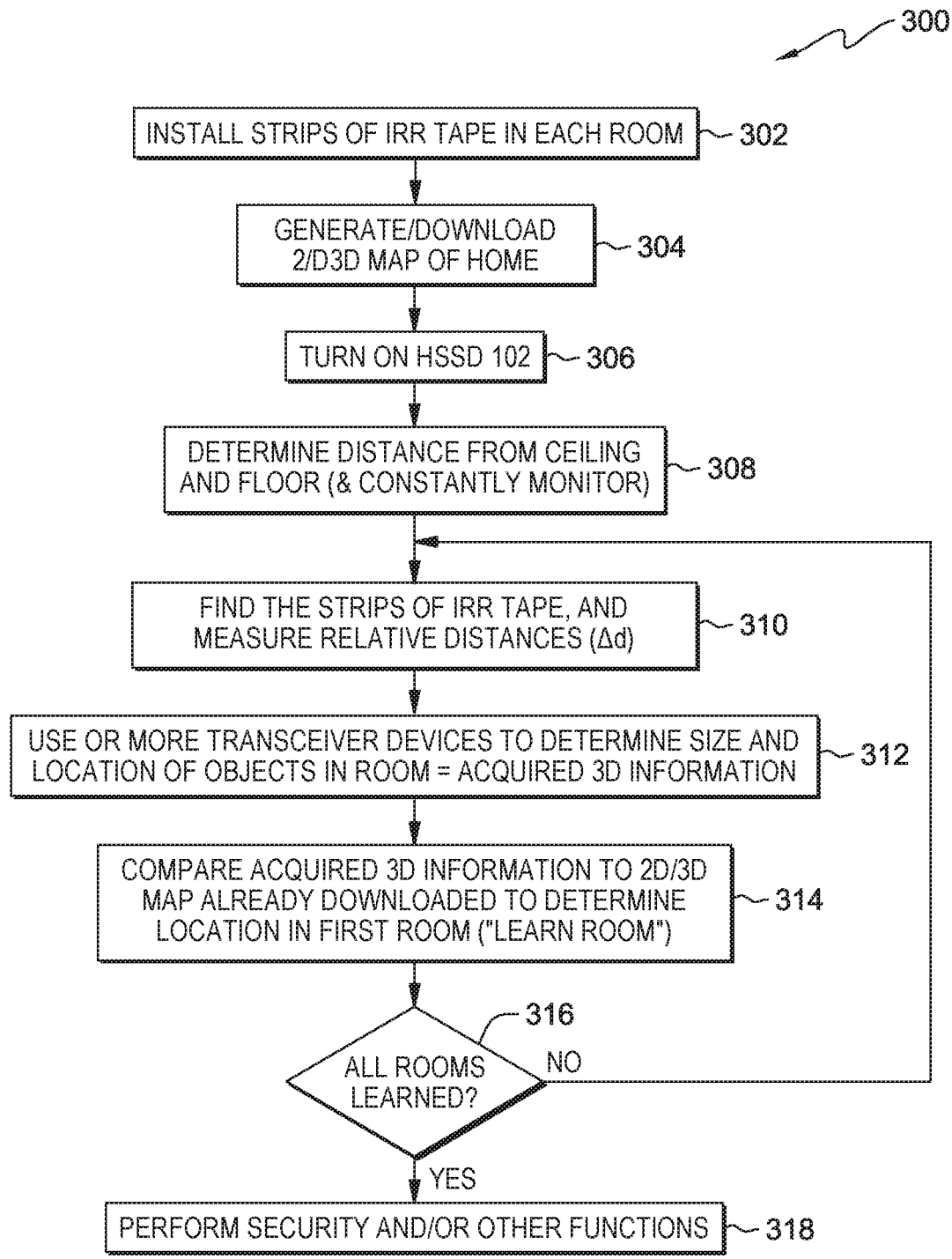
FIG. 3 illustrates a flow chart of a method of operation of the micro autonomous aerial vehicle within a home environment according to aspects of the embodiments.

FIG. 3 illustrates a flow chart of method 300 of operation of HSSD 102 within a home environment according to aspects of the embodiments. Use of HSSD 102 is not limited to use within a home or house; that is, HSSD 102 can be used in substantially any type of building, or even outside, as long as such use is within communications ranges of the communication devices employed by HSSD 102 (e.g., if a satellite transceiver was implemented in HSSD 102 there would be practically no place HSSD 102 could not be used, and the limitation of fuel/energy and environment would be more restrictive) according to aspects of the embodiments. However, in fulfillment of the dual purposes of clarity and brevity, discussion herein will only be made in reference to home 100.

Figure 4:
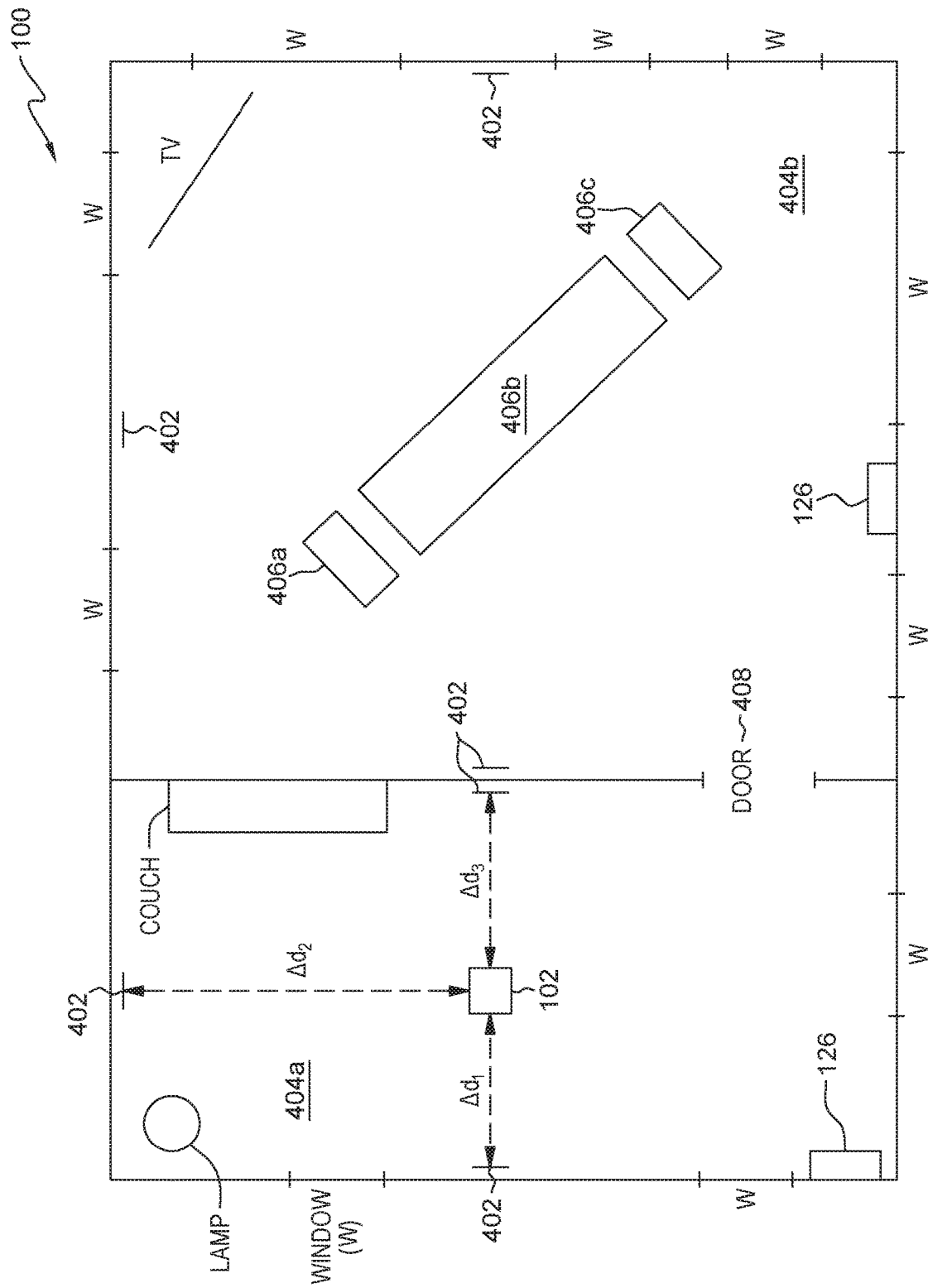
FIG. 4 illustrates a diagram of two rooms within a home depicting a portion of the method of FIG. 3 in which the micro autonomous aerial vehicle is able to determine its location therein according to aspects of the embodiments.

According to aspects of the embodiments, HSSD 102 will operate, in home 100, in a closed environment. That is, the environment will be the interior of the home or house 100, and each room will have, necessarily, three dimensions, and be interconnected with one or more other rooms (bathroom to hallway, hallway to one or more bedrooms, hallway to living room, and so on). Even though HSSD 102 has a three dimensional (3D) map of the interior space, what it does not have when it is first turned on (in method step 306), is a determination of where it is within home 100: thus, method steps 302-314 describe the process of HSSD 102 learning where it is within the 3D space, and then operating substantially autonomously thereafter: collectively, the system and process of steps 302-318 can be referred to as an indoor positioning system and object avoidance (IPS/OA). There are numerous methods for "teaching" HSSD 102 its location within home 100; global positioning sensors can be used, if they are of sufficient sensitivity, or NFC devices, or one of the several different varieties of BT communications standards devices can be used; each of these methods and apparatuses are considered to be within the scope of the aspects of the embodiments. As those of skill in the art can no doubt appreciate, each of these communications systems requires interaction with some external device or devices, each of which needs to be powered, maintained, and possibly replaced in the event errors occur, or the devices broken. Further, there is a significant expense in acquisition and use of each of these devices. According to aspects of the embodiments, an alternative method and device can be used that is not expensive, does not require power to be provided to the device (whether in the form of batteries or wired power), and which requires substantially much less maintenance, and therefore will last substantially longer than any of the aforementioned devices. Such a device according to aspects of the embodiments is the use of IR reflector tape (IRR tape) 402, which is shown in FIG. 4 (which is described in greater detail below).

IRR tape 402 can be placed on two, three, or four walls of each room of home 100 according to aspects of the embodiments. Placing IRR tape 402 in all of the walls will shorten the learning process, but is not necessary according to aspects of the embodiments. IRR tape 402 is substantially colorless or clear, and only a small piece is needed for HSSD 102 to acquire it with IR transceiver 238 according to aspects of the embodiments. Thus, method 300 begins with method step 302 in which a user/operator/installer places a small piece of IRR tape 402 on two or more walls of each room of home 102, the exact location of which is not critical according to aspects of the embodiments, as long as the IRR tape 402 is readily viewable by the sensors of HSSD 102 when it is in a hover or transit mode of operation. According to aspects of the embodiments, while any height can be achieved/attained by HSSD 102, a typical height can be about 5' to about 6' above floor level.

In method step 304, a user/operator generates and then downloads into HSSD 102 a two-dimensional (2D) or 3D map or model of a business location or home 100 to HSSD 102. The user can create the 2D/3D map/model using substantially any of the currently available drafting applications or software programs, and can use HSSD App 120 stored on PC 104 to convert the file to a format that can be used by HSSD 102 according to aspects of the embodiments. Downloading can occur through the act of operating commands in HSSD App 120, or by turning on HSSD 102 (step 306), or through other mechanisms.

The 2D/3D map/model can also be generated through use of a special 2D/3D camera. The 2D/3D camera can be carried by HSSD 102, or can be manipulated by a user/operator. The 2D/3D camera can create the image file in a format that can be understood and processed by HSSD 102 according to aspects of the embodiments. In addition, a user can also scan the interior of the business or home 100 using a stand-alone handheld 3D laser scanner, the output of which can also be in a format usable by HSSD 102 or associated programs or applications.

Once HSSD 102 has the 2D/3D map of the interior space within which it is going to operate, the user can then turn on HSSD 102, or command it to start a learning mode in method step 306, in which HSSD 102 learns or acquire the 3D space within which it will operate. In method step 308, HSSD 102 actively begins the process of learning where it is in the 3D environment within which it is operating. Initially, HSSD 102 determines its distance from the ceiling and floor, and uses that as an initial determination of spaces it can eliminate from consideration of its location. For example, if there are four rooms in home 100, and three of them have a height of 10 feet, and one has a height of 8 feet, a determination that the height of the room within which it is currently located is 8 feet will let HSSD 102 which room it is specifically located within. However, as those of skill in the art can no doubt appreciate, such variations in height of rooms in conventional homes 100 is not typical, and so the height of room determination is more generally usable so as to determine its position on stairwells, or within foyers and the like. Nonetheless, as an initial screening point, it can eliminate spaces according to aspects of the embodiments. HSSD 102 will substantially continuously monitor the height of the room within which it is located. Knowledge of the height of the rooms in the building assists in object avoidance.

In method step 310, HSSD 102 searches for its position relative to the two or more pieces of IRR tape 402 that has been placed in each room. If it cannot find all of the pieces of IRR tape 402, it will let the user know by a communication so that the user can reposition one or more of the pieces of IRR tape 402; according to further aspects of the embodiments, HSSD 102 can indicate to the user which pieces of IRR tape 402 it cannot find. In addition to use of IR transceiver 238 to find IRR tape 402, HSSD 102 can also use the on-board laser transceiver 250 to determine distances between itself and all of the walls, floor and ceiling of the room within which it is located.

Once HSSD 102 finds at least two pieces of IRR tape 402, it determines its relative position between each of them (Step 310). That is, HSSD 102 finds its location within the room it is located. It can now ascertain at least the height of the room, and a length or width. This additional information can be used to eliminate one or more rooms from consideration as a possible current location of HSSD 102. Then, in method step 312, HSSD 102 uses one or more of the transceiver devices (238, 250) to discern objects such as windows, doors, openings, and furniture, or other features, as a means for determining its position. Over a period of time HSSD 102 will determine the room within which it is located, and then begin the process of determining the presence of objects within the room (furniture, fixture, lamps, televisions (TVs), and the like), and begin to add constructive spatial detail to the 3D map that was downloaded previously. According to aspects of the embodiments, the result of acquiring a spatially detailed 3D map self-generated can be referred to as "acquired 3D information."

According to further aspects of the embodiments, HSSD 102 can also determine or map an interior 3D space using one of at least two additional methods. The first is for a user to digitally map an interior space of home 100 by using a 3D camera; this creates a file that can be accessed by HSSD 102 and which, like the 2D map described above provides spatial information about substantially the entire interior of home 100; then HSSD 102 can use method 300 to determine its location within home 100, learn the location and dimensions of objects within home 100 using the laser/IR/acoustical transceiver(s). Alternatively, the three dimensional cameras can be carried on-board HSSD 102 and the 3D map of the interior of home 100 can be created by itself as it performs method 300 according to aspects of the embodiments.

FIG. 4 illustrates a diagram of two rooms within home 100 depicting a portion of the method of FIG. 3 in which HSSD 102 is able to determine its location therein according to aspects of the embodiments. FIG. 4 illustrates a simplified 2D diagram of home 100 with only two, showing, in part, how HSSD 102 begins to ascertain its location within home 100, and then learn of the objects within each room.

In method step 314, HSSD 102 compares the acquired 3D information to the 2D/3D map downloaded and stored in method step 304, and creates a new, more detailed version of the room and its location therein; this process can be referred to as "learning the room" or "learn room." Once HSSD 102 has learned a room, it can move onto to other room, with greater confidence in its position and in its understanding of a 3D map of home 102. The process of HSSD 102 determining its location occurs in method steps 310-314; then, in decision step 316 HSSD 102 determines whether it has learned all of the rooms in home 100; if it has not ("No" path from decision step 316), it repeats steps 308-314 for each room in home 100, and if it has ("Yes" path from decision step 316), HSSD 102 proceeds to operational step 318, in which it begins to perform one or more further processes, as described above, of safety and security, communications, entertainment, and providing information, among others, according to further aspects of the embodiments. As described above, steps 310-318 of method 300 can be referred to as IPS/OA; when performing step 318, HSSD 102 uses one or more of indoor positioning and object avoidance; HSSD 102 needs to know where it is inside the home or business, but then, when either directed to go someplace, or whether it decides to move about, it practices object avoidance (OA). According to an aspect of the embodiments, performing OA can be different from finding objects and then flying around them. In performing OA, HSSD 102 flies into empty airspace. It does not necessarily need to know the exact coordinates within the room it is located, but it does need to know that there is nothing the air space in which it is being directed to (or going to on its own). To perform OA, HSSD 102, through use of method 300, and Apps 120, 217, has used indoor positioning to learn the 3D space within which it operates; it now has a digitally stored layout in all three dimensions of home 100 or the building it is within. Through use of laser gyroscopes, micro-electronic machined systems (MEMs) technology, among other types of position determining technology, HSSD 102 knows its position within the interior space; it has created a library of objects using the laser based sonar-like mapping function to determine their location and 3D coordinates. HSSD 102 can access this information, either stored on-board or in PC 104, and using its own current velocity/acceleration information determine its position and know where the empty space is located.

According to an aspect of the embodiments, a user/owner/operator could perform method 300 just prior to bedtime (leaving the occupied bedrooms to be learned at a later time), or could be performed just prior to leaving the home for work, shopping, or other activity. According to still further aspects of the embodiments, it is not necessary for people to not be in home 100 when HSSD 102 executes or performs method 300; however, as those of skill in the art can appreciate, it can take more time if people are present, if doors are constantly being open, and things of that nature are occurring; according to aspects of the embodiments, execution of method 300 can further take different amounts of time dependent on the size and complexity of home 100.

Once HSSD 102 has completed applying spatial detail to all of the rooms in home 102 ("Yes" path from decision step 316), it can then start to perform one or more of the functions of safety and security, entertainment, communications, among others, as described in reference to the devices that can be made part of HSSD 102 as discussed in reference to FIG. 2 (e.g., bio-detector 226, carbon monoxide (CO) detector 330, camera 242, among others). From time-to-time, HSSD 102 will need to re-charge itself; an additional item that HSSD 102 substantially continuously maintains is its position relative to its base charger; if its battery 208 approaches a "bingo" level (an amount of remaining charge capable of getting HSSD 102 back to its charger with minimum additional reservoir to compensate for longer than expected hover times, or air currents, among other factors that might negatively affect flight duration), HSSD 102 will automatically initiate a return maneuver, in which it stops what it is doing, communicates to HSSD App 120 its decision to return to its base charger, and then does so. HSSD App 120 can then notify the owner/user/operator of the return of HSSD 102 to its home base in the event of some serious or important task that HSSD 102 was performing.

Figure 5:
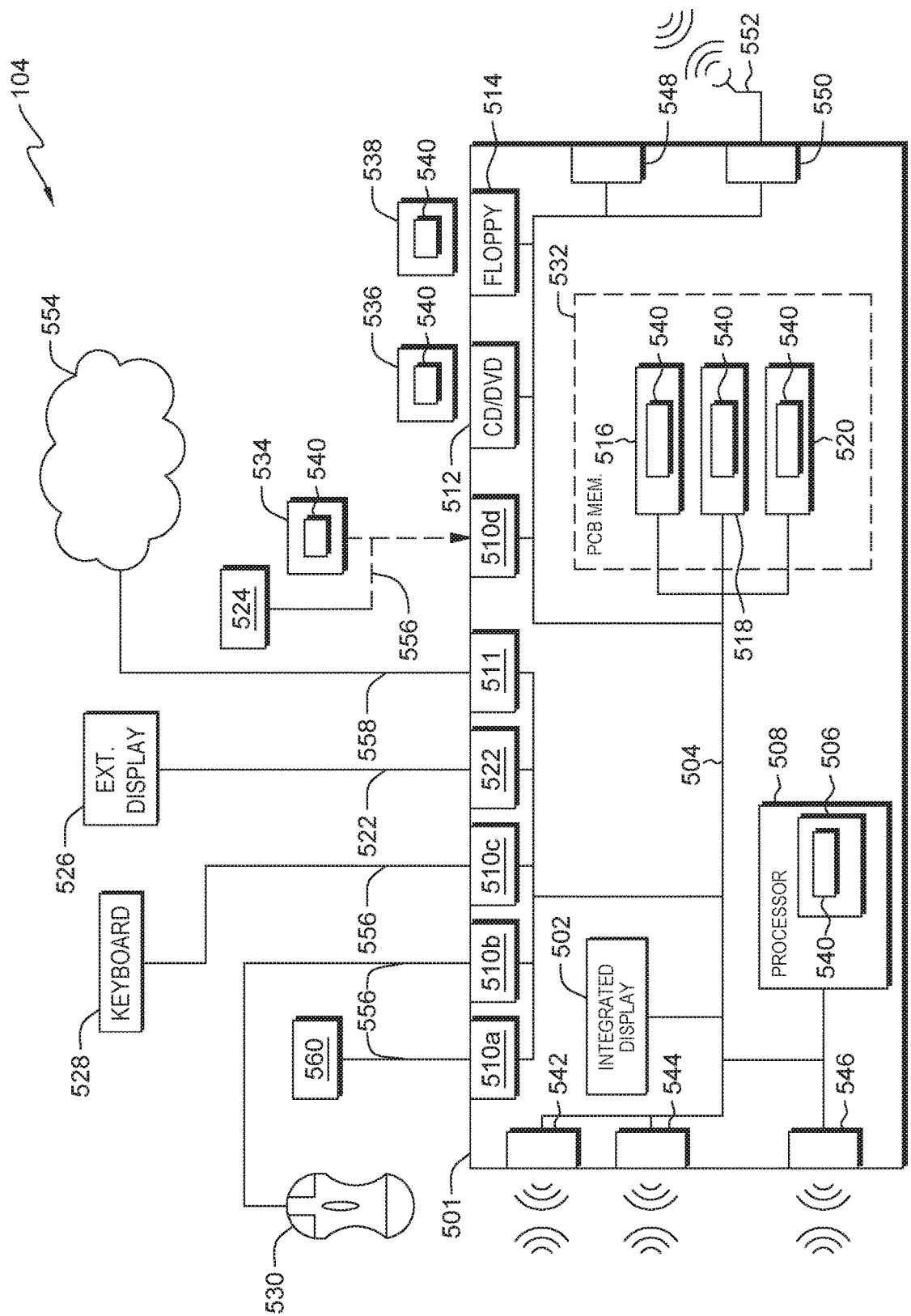
FIG. 5 illustrates a block diagram of a personal computer/server for use with the micro autonomous aerial vehicle according to aspects of the embodiments.

FIG. 5 illustrates a block diagram of PC 104 and processor 214 for use with, and in, HSSD 102 according to aspects of the embodiments. The block diagram of FIG. 5 illustrates the components and interconnections of a PC or processor that can be used as PC 104 or as the processor in HSSD 102 according to aspects of the embodiments. Accordingly, as PC 102 and HSSD 102 have somewhat different requirements, not all of the devices that interface with a processor in PC 104 will be needed for processor 214, and visa verse; thus, as those of skill in the art can appreciate, there will be some overlap and in some instances there will be some differences in terms of associated hardware/software devices. In fulfillment of the dual purposes of clarity and brevity, therefore, discussion shall be made in regard to FIG. 5 as PC 104 alone, notwithstanding the dual nature of the elements of the Figure, as described above.

Referring now to FIG. 5, there is shown therein illustrates a PC/laptop/Server (herein after, "server") 104 suitable for use to implement method 300 for operation of HSSD 102 within a home environment according to aspects of the embodiments according to an embodiment. Server 104 includes, among other items, shell/box 501, internal data/command bus (bus) 504, processor(s) 508 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 510, compact disk (CD)/digital video disk (DVD) read/write (R/W) drive 512, floppy diskette drive 514 (though less used currently, many servers still include this device), and data storage unit 532. According to further embodiments, a controller can be used in place or, or in conjunction with processor 508, wherein the controller can include one or more hardware components designed and/or fabricated to replicate the functionality of processor 508. According to still further embodiments, processor 508 and a controller can be used interchangeably or in combination to perform the processing functions described herein.

Data storage unit 532 itself can comprise hard disk drive (HDD) 516 (these can include conventional magnetic storage media, but, as is becoming increasingly more prevalent, can include flash drive-type mass storage devices (or as they are sometimes referred to as, solid state drives (SSDs)) 534, among other types), read-only memory (ROM) device(s) 518 (these can include electrically erasable (EE) programmable ROM (EEPROM) devices, ultra-violet erasable PROM devices (UVPROMs), among other types), and random access memory (RAM) devices 520. Usable with USB port 510 is flash drive device 534, and usable with CD/DVD R/W device 512 are CD/DVD disks 536 (which can be both read and write-able). Usable with floppy diskette drive device 514 are floppy diskettes 538. Each of the memory storage devices, or the memory storage media (516, 518, 520, 534, 536, and 538, among other types), can contain parts or components, or in its entirety, executable software programming code (App) 540, which can implement part or all of the portions of method 300 described herein. Further, processor 508 itself can contain one or different types of memory storage devices (most probably, but not in a limiting manner, RAM memory storage media 520) that can store all or some of the components of App 540. As those of skill in the art can appreciate, one or more of the applications or programs can be stored remotely, e.g., through use of "cloud" technology.

In addition to the above described components, server 104 also comprises user console 524, which can include keyboard 528, display 526, and mouse 530. All of these components are known to those of ordinary skill in the art, and this description includes all known and future variants of these types of devices. Display 526 can be any type of known display or presentation screen, such as liquid crystal displays (LCDs), light emitting diode displays (LEDs), plasma displays, cathode ray tubes (CRTs), among others. User console 524 can include one or more user interface mechanisms such as a mouse, keyboard, microphone, touch pad, touch screen, voice-recognition system, among other inter-active inter-communicative devices.

User console 524, and its components if separately provided, interface with server 104 via USB port 510, which can also be an RS232, or other type of communications port, or can include all or some of these, and further includes any other type of communications means, presently known or further developed. Server 104 can further include communications satellite/global positioning system (satellite) transceiver device 550 to which is electrically connected at least one antenna 552 (according to an embodiment, there can be at least one global positioning system (GPS) receive-only antenna, and at least one separate satellite bi-directional communications antenna). Server 104 can access internet 554, either through a hard wired connection (e.g., Ethernet port 522) directly, or wirelessly via Wi-Fi transceiver 542, 3G/4G/5G transceiver 548 and/or satellite transceiver device 550 (and their respective antennas) according to aspects of the embodiments. Server 104 can also be part of a larger network configuration as in a local area network (LAN), wide area network (WAN), and/or global area network (GAN) (e.g., internet 554), which ultimately allows connection to various landlines.

According to further embodiments, user console 524 provides a means for personnel to enter commands and configuration into server 104 (e.g., via a keyboard, buttons, switches, touch screen and/or joy stick). Display device 526 can be used to show visual representations of acquired data, and the status of applications that can be running, among other things, such a use interface for operating HSSD 102 according to aspects of the embodiments.

Bus 504 provides a data/command pathway for items such as: the transfer and storage of data/commands between processor 508, Wi-Fi transceiver 542, BT transceiver 544, 5FC transceiver 546, internal display 502, video graphics array (VGA) port or high definition multimedia interface (HDMI) 522, USB port 510, Ethernet port 511, CD/DVD drive 512, floppy diskette drive 514, memory 532, 3G/4G/5G transceiver 548 and satellite transceiver device 550. Through bus 504, data can be accessed that is stored in data storage unit memory 532. Processor 508 can send information for visual display to display device 526, and the user can send commands to system operating programs/software/Apps 540 that might reside in either processor 508.

Server 104, and either memory 506 or memory 532, can be used to implement method 300 for operation of HSSD 102 within a home environment according to aspects of the embodiments according to an embodiment. Hardware, firmware, software or a combination thereof can be used to perform the various steps and operations described herein. According to an embodiment, App 540 for carrying out the above discussed steps can be stored and distributed on multi-media storage devices such as devices 516, 518, 520, 534, 536 and/or 538 (described above) or other form of media capable of portably storing information, and storage media 534, 536 and/or 538 can be inserted into, and read by, devices such as USB port 510, CD-ROM drive 512, and disk drives 514, 516, among other types of software storage devices.

As also will be appreciated by one skilled in the art, the various functional aspects of the embodiments can be embodied in a micro autonomous aerial vehicle. Accordingly, the embodiments can take the form of an entirely hardware embodiment or an embodiment combining hardware and software aspects. Further, the embodiments can take the form of a non-transitory computer program product stored on a computer-readable storage medium having computer-readable instructions embodied in the medium. Any suitable computer-readable medium can be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to FPGAs, ASICs, microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, DVDs, or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable, volatile/nonvolatile, and transitory/non-transitory computer storage media. For example, the processor can access a hard disk drive that reads from or writes to non-removable, nonvolatile, and non-transitory magnetic media, a magnetic disk drive that reads from or writes to a removable, nonvolatile, and non-transitory magnetic disk, and/or an optical disk drive that reads from or writes to a removable, nonvolatile, and non-transitory optical disk, such as a CD-ROM or other optical media. Other removable/non-removable, volatile/nonvolatile, and non-transitory computer storage media that can be used in the operating environment include, but are not limited to, magnetic tape cassettes, flash memory cards, digital versatile disks, digital video tape, solid state RAM, solid state ROM and the like. A HDD can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertain.

Figure 6:
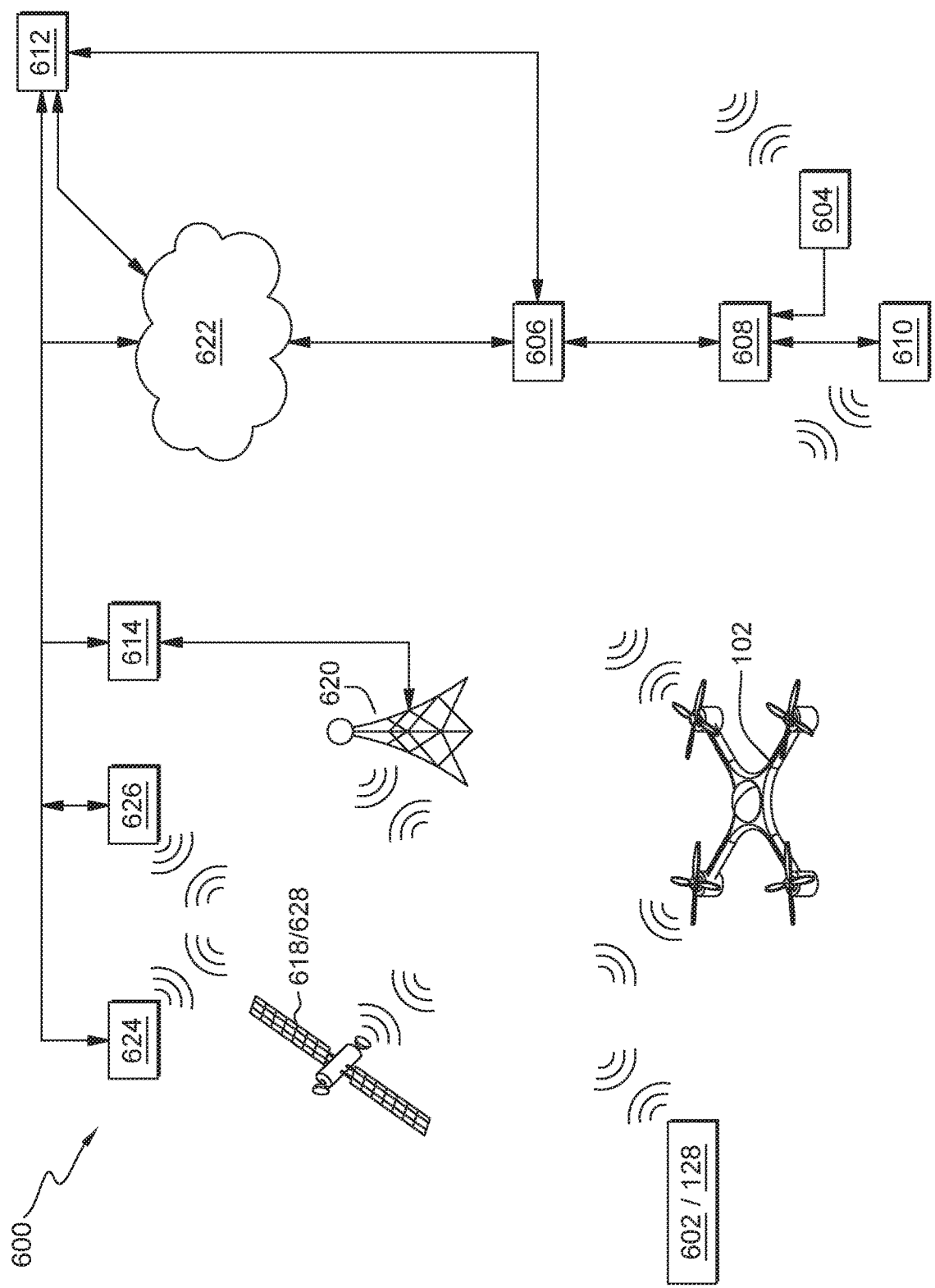
FIG. 6 illustrates a block diagram of a network within which the micro autonomous aerial vehicle can provide and receive information according to aspects of the embodiments.

FIG. 6 illustrates a block diagram of a network within which the micro autonomous aerial vehicle can provide and receive information according to aspects of the embodiments.

FIG. 6 illustrates network system 600 within which the system and method for operation of HSSD 102 within a home environment can be implemented according to an embodiment. Much of the network system infrastructure shown in FIG. 6 is or should be known to those of skill in the art, so, in fulfillment of the dual purposes of clarity and brevity, a detailed discussion thereof shall be omitted.

According to an embodiment, a user of the system and method for operation of HSSD 102 within a home environment according to aspects of the embodiments can have an App on their mobile device 602; mobile devices 602 can include, but are not limited to, so-called smart phones, tablets, personal digital assistants, notebook and laptop computers, and essentially any device that can access the internet and/or cellular phone service or can facilitate transfer of the same type of data in either a wired or wireless manner. For purposes of this discussion, the user shall be discussed as using only mobile device 602, i.e., a smartphone, though such discussion should be understood to be in a non-limiting manner in view of the discussion above about the other types of devices that can access, use, and provide such information.

In FIG. 6, the user has mobile device 602, which can access cellular service provider 614, either through a wireless connection (cellular tower 620) or via a wireless/wired interconnection (a "Wi-Fi" system that comprises, e.g., modulator/demodulator (modem) 608, wireless router 610, PC 104, internet service provider (ISP) 606, and internet 622). Further, mobile device 602 can include near field communication (NFC), "Wi-Fi," and BT communications capabilities as well, all of which are known to those of skill in the art. To that end, network system 600 further includes, as many homes (and businesses) do, one or more PCs/servers 104 that can be connected to wireless router 610 via a wired connection (e.g., modem 608) or via a wireless connection (e.g., Bluetooth). Modem 608 can be connected to ISP 606 to provide internet based communications in the appropriate format to end users (e.g., PC 104), and which takes signals from the end users and forwards them to ISP 606. Such communication pathways are well known and understand by those of skill in the art, and a further detailed discussion thereof is therefore unnecessary.

Mobile device 602 can also access global positioning system (GPS) satellite 628, which is controlled by GPS station 624, to obtain positioning information (which can be useful for different aspects of the embodiments), or mobile device 602 can obtain positioning information via cellular service provider 614 using cell tower(s) 620 according to one or more well-known methods of position determination. Some mobile devices 602 can also access communication satellites 618 and their respective satellite communication systems control stations 626 (the satellite in FIG. 6 is shown common to both communications and GPS functions) for near-universal communications capabilities, albeit at a much higher cost than convention "terrestrial" cellular services. Mobile device 602 can also obtain positioning information when near or internal to a building (or arena/stadium) through the use of one or more of NFC/BT devices, the details of which are known to those of skill in the art. FIG. 6 also illustrates other components of network system 600 such as plain old telephone service (POTS) provider 612.

According to further aspects of the embodiments, network system 600 also contains server 104, wherein one or more processors, using known and understood technology, such as memory, data and instruction buses, and other electronic devices, can store and implement code that can implement the system and method 300 for operation of HSSD 102 within a home environment according to aspects of the embodiments.

As described above, an encoding process is discussed in reference to FIG. 3. The encoding process is not meant to limit the aspects of the embodiments, or to suggest that the aspects of the embodiments should be implemented following the encoding process. The purpose of the encoding process described herein is to facilitate the understanding of one or more aspects of the embodiments and to provide the reader with one or many possible implementations of the processed discussed herein. FIG. 3 illustrates a flowchart of various steps performed during the encoding process. The steps of FIG. 3 are not intended to completely describe the encoding process but only to illustrate some of the aspects discussed above.

The disclosed embodiments provide a source array, computer software, and a method for operation of HSSD 102 within a home environment according to aspects of the embodiments. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

I claim:

1. A heavier-than-air programmable aircraft system (aircraft) for use in monitoring a building, comprising:
   the aircraft having dimensions suitable for use in the building and being adapted to move within the building in the air;
   a position determining system adapted to determine a relative position of the aircraft within a building and within a room of said building based upon at least one of
   (1) acquiring spatial dimensional information regarding at least one of the walls, ceiling and floor of the room
      (a) being input by a user;
      (b) being collected remotely and input upon detection; and
      (c) being captured directly by a coupled camera;
   (2) enhancing the acquired dimensional information with one or more additional parameters of the room with at least one of:
      (a) capturing a first distance information of the aircraft in relation to a said ceiling and a said floor of a said room;
      (b) capturing a second distance information of the aircraft in relation to a said wall and another said wall of a said room; and
      (c) capturing locational information of any objects within a said room by one or more transceivers of the aircraft; and
   (3) determining the identity of a said room of the building based upon at least one of said acquiring spatial information (1) and said enhancing the acquired dimensional information (2);
   one or more communications systems adapted to be carried by the aircraft; and
   a processor system adapted to receive data and commands through use of the one or more communications systems, and facilitate generation of the 3D image of the interior space of the building through use of the position determining system.

2. The system according to claim 1, further comprising:
   one or more devices, a first subset of which are adapted to generate environmental and other types of data about the interior space of the building and exterior space around the building, and wherein a first portion of the first subset of the devices are adapted to be carried by the aircraft and to interface with the processor to communicate data generated by the one or more monitoring systems to a user.

3. The system according to claim 2, wherein the one or more devices comprise:
   monitoring devices selected from the group consisting of a bio-detector/airborne pathogen detector, natural gas detector, carbon monoxide detector, and fire/smoke detector.

4. The system according to claim 1, further comprising:
   one or more devices, a first subset of which are adapted to generate environmental and other types of data about the interior space of the building and exterior space around the building, and wherein a first portion of the first subset of the devices are adapted to be located in the building, and adapted to communicate with the aircraft through the one or more communications systems carried by the aircraft.

5. The system according to claim 4, wherein the one or more devices comprise:
   monitoring devices selected from the group consisting of a bio-detector/airborne pathogen detector, natural gas detector, carbon monoxide detector, and fire/smoke detector.

6. The system according to claim 1, wherein the one or more communications systems comprise:
   a communications system selected from the group consisting of a microphone, speaker, infra-red transceiver, optical reader/scanning surface, camera, display, video projector, and iris scanner.

7. The system according to claim 1, wherein
   the processor is further adapted to respond to program commands to monitor an environment of the building within which the aircraft operates.

8. The system according to claim 1, wherein the processor is further adapted to respond to program commands to perform security functions that include one or more of determining the number of and identity of one or more intruders in the building, the location of entry into the building, and the time of entry into building.

9. The system according to claim 8, wherein the processor is further adapted to capture an image of the intruder without direct commands to capture the image.

10. The system according to claim 9, wherein the processor is further adapted to verify if the image of the intruder matches an image of known occupants, friends, relatives of owners of the building.

11. The system according to claim 8, wherein the position determining system is further adapted to acquire the relative position and size of at least one or more of doors, windows, entrances, exits, and furniture within a said room.

12. The system according to claim 11, wherein
   the processor and position determining system are further adapted to move the aircraft through empty space of the building using spatial 3D model of the building.

13. The system according to claim 1, wherein
   the aircraft is further adapted for self-controlled movement within the building.

14. The system according to claim 1, wherein
   the aircraft is further adapted to receive movement controls by one or more programs located on one or more of a computer, hand-held programmable device, smartphone, and a remotely located computer through a server network.

15. A system for use in monitoring a building comprising:
a heavier-than-air programmable aircraft (aircraft) of dimensions suitable for use in the building and adapted to move within the building in the air;
a position determining system adapted to determine a relative position of the aircraft within any room of the building and acquire additional spatial information of any room within the building so that the aircraft can travel within the building, and wherein the position determining system is further adapted to facilitate generation of a three-dimensional (3D) image representing an interior space of the building;
one or more communications systems adapted to be carried by the aircraft; and
a processor system adapted to receive data and commands through use of the one or more communications systems, and facilitate generation of the 3D image of the interior space of the building through use of the position determining system;
wherein the position determining system comprises:
memory storage adapted to store at least one of a two-dimensional (2D) image file of the interior space of the building and a 3D image file of the interior space of the building; and
the processor, further adapted to determine an identity of a first room in the building by—
determining a relative position between a base station and the current location of the aircraft,
determining the dimensions of the first room by determining the presence and relative distances between two or more infra-red reflectors in the first room and a current position of the aircraft, and
using the determined relative position information and the determined relative distance information of the infra-red reflectors to match the same against the at least one of the 2D image file and the 3D image file representing the interior space of the building to generate a spatial 3D model of the building.

16. The system according to claim 15, wherein the position determining system further comprises:
a distance measurement device adapted to measure relative distances in all three dimensions between the aircraft and substantially any object in the room, as well as the walls, ceiling, and floor of the room.

17. The system according to claim 16, wherein the distance measurement device can be at least one of a laser transceiver, an infra-red transceiver, and an acoustic transceiver.

18. The system according to claim 15, wherein the processor is adapted to determine the relative position between the aircraft and the base through use of at least one of a laser gyroscope and micro electro-mechanical system device.

19. The system according to claim 15, further comprising:
a 3D camera adapted to generate the 3D image model of the interior space of the building for use by the aircraft.

20. The system according to claim 19, wherein the 3-D camera is adapted to be carried by the aircraft.

* * * * *